July 1, 1930. F. J. CUTHBERTSON 1,768,976
COMPARTMENT DISH FOR HORS-D'ŒUVRE
Filed March 2, 1929
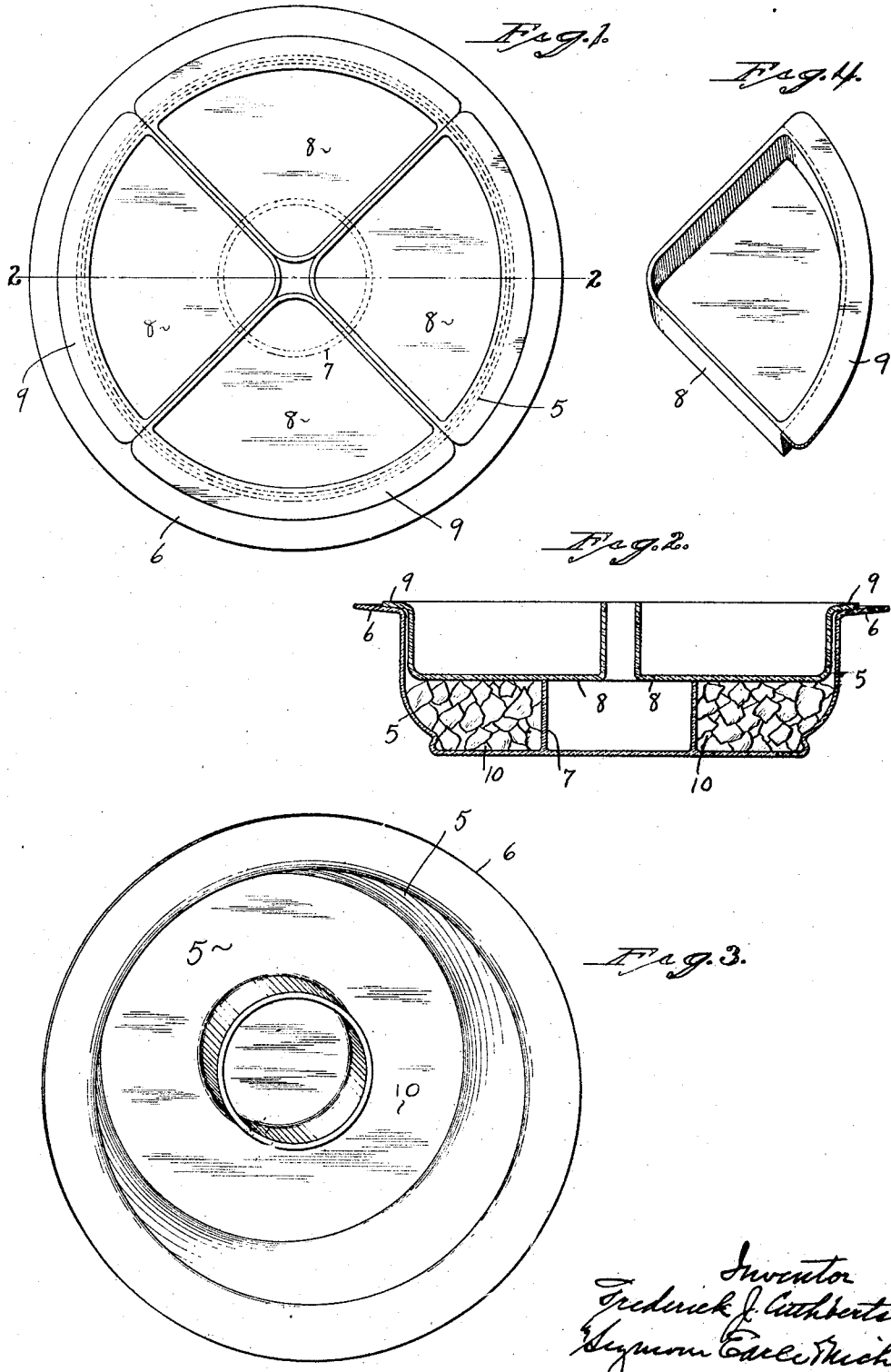

Patented July 1, 1930

1,768,976

UNITED STATES PATENT OFFICE

FREDERICK J. CUTHBERTSON, OF NEW HAVEN, CONNECTICUT

COMPARTMENT DISH FOR HORS D'ŒUVRE

Application filed March 2, 1929. Serial No. 343,936.

My invention relates to an improved dish for chilling and serving hors-d'œuvre, the object being to provide a convenient, effective and handsome dish for serving a variety of hors-d'œuvre segregated in separate compartments and chilled by cracked ice beneath them.

With these ends in view, my invention consists in a dish for segregating and chilling hors-d'œuvre consisting of a relatively-deep ice-bowl, a concentric integral supporting-flange rising from the bottom of the said bowl, and a plurality of sector-shaped hors-d'œuvre dishes fitting together to form a complementary circle and resting upon the said supporting-flange and upon the upper edge of the bowl.

In the accompanying drawings:

Fig. 1 is a plan view of my improved hors-d'œuvre dish;

Fig. 2 is a view thereof in vertical central section on the line 2—2 of Fig. 1;

Fig. 3 is a perspective view thereof with the sector-shaped hors-d'œuvre dishes and ice removed; and Fig. 4 is a detached perspective view of one of the sector-shaped hors-d'œuvre dishes.

In carrying out my invention as herein shown, I employ a relatively-deep circular ice-bowl 5 having a wide nearly-horizontal rim or marly 6 and formed with an integral concentric supporting-flange 7 rising from its bottom, as shown, to about half its height, though the height of the flange may be varied as desired. Within the upper portion of the said bowl 5 I locate a plurality of flat-bottomed sector-shaped hors-d'œuvre dishes 8 having supporting-flanges 9 projecting from their arcuate outer edges. As shown, the four dishes 8 are quadrants and together fill the upper half of the ice-bowl but they may be varied in number and capacity as desired, so long as they are adapted, when assembled, to fill the upper part of the bowl 5, in which they will be supported by the resting of their bottom portions upon the flange 7 thereof or its equivalent, and by the resting of their flanges 9 upon the rim 6 of the bowl.

In using my improved dish the annular ice-chamber 10 surrounding the concentric supporting-flange 7 of the ice-bowl is filled with broken, crushed or pulverized ice to a height even with the upper edge of the said flange, after which the horse-d'œuvre dishes 8 are installed over the ice, whereby the hors-d'œuvre dishes will be promptly chilled and kept so until the ice melts. If desired, the circular chamber within the flange 7 may also be filled with ice.

Preferably, the means, within the bowl, for supporting the hors-d'œuvre dishes will be in the form of an integral circular supporting-flange 7 as shown, though this is not essential so long as the supporting-means rises from the bottom of the bowl to a sufficient height to provide for an ample supply of ice and provides a sufficiently stable support for the hors-d'œuvre dishes which will be exteriorly supported by their arcuate flanges upon the rim or edge of the bowl.

I claim:

A dish for segregating and chilling hors-d'œuvre, consisting of a circular relatively-deep ice-bowl having its upper edge provided with an outstanding annular rim, an integral concentric supporting-flange rising from the bottom of the said bowl and having its upper edge located well below the said annular rim thereof and forming an annular ice-chamber in conjunction with the outer wall and bottom thereof, and a plurality of sector-shaped hors-d'œuvre dishes fitting within the upper portion of the bowl to form a complementary circle filling the same, provided upon their arcuate edges with supporting-flanges resting upon the said rim of the bowl and having their inner portions resting upon and extending inwardly over the said concentric flange so as to symmetrically overhang the same and abut near the center thereof, whereby they are held against radial inward or outward displacement.

In testimony whereof, I have signed this specification.

FREDERICK J. CUTHBERTSON.